Patented Nov. 10, 1953

2,658,899

UNITED STATES PATENT OFFICE 2,658,899

SULFONATED ANTHRAQUINONE NAPHTHO-CARBAZOLE DYESTUFFS AND PROCESS FOR PREPARING THEM

James Ogilvie, Buffalo, N. Y., assignor to Allied Chemical & Dye Corporation, New York, N. Y., a corporation of New York No Drawing. Application June 7, 1951, Serial No. 230,439

14 Claims. (Cl. 260—316)

This invention relates to novel dyestuffs of the anthraquinone naphthocarbazole series and to a process for preparing them, and more particularly to acid dyestuffs of this series.

Acid dyestuffs of the anthraquinone naphthocarbazole series have been prepared in the past, and have included sulfonated, carbazolized 1-acylamino - 2 - alkyl - 4 - (2-naphthylamino) anthraquinones. These dyestuffs have the property of dyeing wool and other fibers from neutral and acid baths, brown shades of excellent light fastness having reddish to yellowish casts depending on the particular dyestuff. The brown shades produced by such dyestuffs, however, are lacking in depth and intensity of the dark reddish brown shades desired for many purposes.

An object of the present invention is to provide new dyestuffs of the above series which dye animal fibers and the like, dark brown shades of redder and darker character than has been possible through the use of prior art dyestuffs of this series.

Another object is to provide dyestuffs of the above character having excellent light fastness and other fastness properties.

Still another object is to provide a process for preparing such dyestuffs.

These and other objects are accomplished according to my invention by my new dyestuff compositions which have the general formula given below

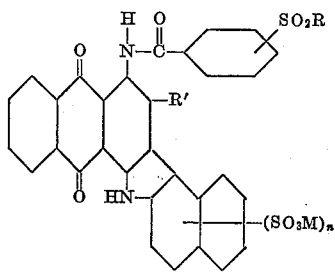

wherein R represents a hydrocarbon radical containing from 1 to 12 carbon atoms inclusive and which may be aliphatic, cycloaliphatic, aromatic or hydroaromatic; R' represents hydrogen, methyl, halogen or —SO$_3$M; M represents hydrogen or a salt forming radical including ammonium, and $n$ is a positive integer.

The new dyestuffs of my invention may be obtained by treating dyestuff bases of the general formula

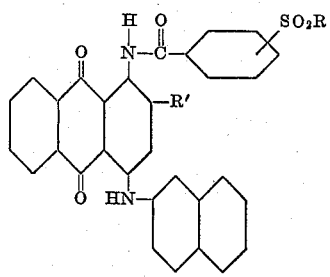

wherein R and R' have the same meanings as above, with a sulfonating agent to carbazolize the compound and introduce at least one sulfo group.

The dyestuff bases used in the above reaction may themselves be prepared by condensing the corresponding 1-[(hydrocarbonsulfonyl)-benzamido]-4-halogenoanthraquinone with 2-naphthylamine by conventional methods, for example by heating equivalent quantities of the reactants in o-dichlorobenzene in the presence of potassium acetate as an acid-binding agent and copper acetate as a condensation catalyst to about 170° C. for about 10 hours, cooling the mixture to about 70° C., adding ethyl alcohol to precipitate the dyestuff base, filtering off the dyestuff base, washing it with ethyl alcohol, extracting it with hot dilute (e. g. 5%) sulfuric acid in order to remove inorganic materials and washing it acid free with water. The 1-[(hydrocarbonsulfonyl)benzamido] - 4 - halogenoanthraquinones used in the above synthesis may be prepared by heating the corresponding 1-amino-4-halogenoanthraquinone with a mol equivalent of the hydrocarbonsulfonylbenzoyl halide in a solvent, such as boiling chlorobenzene, and cooling to precipitate the condensation product.

Alternatively, the dyestuff bases may be prepared by condensing the corresponding 1-amino-4-bromoanthraquinone with 2-naphthylamine, and then acylating the resulting 1-amino-4-(2-naphthylamino)anthraquinone with a hydrocarbonsulfonylbenzoyl halide in a solvent, such as boiling chlorobenzene.

In carrying out the preparation of the new dyestuffs of my invention, the appropriate 1-[(hydrocarbonsulfonyl)benzamido] - 4 - (2-naphthylamino)anthraquinone is subjected to sulfonation with the desired sulfonating agent, preferably by mixing therewith and allowing the mixture to react until carbazolization and the desired degree of sulfonation have taken place, whereupon the reaction mass may be drowned in water or a salt solution to precipitate the dyestuff substantially as free sulfonic acid which may be recovered, if desired, as by filtration. The dyestuff thus recovered may be slurried in water and neutralized with a desired salt-forming cation and isolated as usual. For example, if a water-soluble salt-forming cation is used in order to isolate the dyestuff in its water-soluble salt form, the resulting neutralized solution may be evaporated to dryness or it may be salted, e. g. with NaCl, to precipitate the dyestuff salt, which may then be separated by filtration.

The sulfonating agents adapted for use in preparing the new sulfonated dyestuffs of my invention are the hydrous and anhydrous sulfuric acids, such as sulfuric acid monohydrate (100%), sulfuric anhydride, oleum, chlorosulfonic acid and mixtures of these. The sulfonation may be carried to the extent that only one, or two sulfonic acid groups are introduced.

The optimum conditions for treating the dyestuff bases with sulfuric acid or equivalent sulfonating agent to produce the novel dyestuffs of my invention may vary with the nature of the dyestuff base, nature and concentration of the sulfonating agent, etc. In general, the treatment may be carried out under conditions known in the art for converting 1-acylamino-4-arylaminoanthraquinones to the corresponding 1-acylaminoanthraquinone arylcarbazole sulfonic acid dyestuffs.

Although my invention is not limited to any hypothesis, I believe that the formation of the novel dyestuffs takes place in two stages, whereby there is first formed by the oxidizing action of the sulfonating agent, an anthraquinone naphthocarbazole which is subsequently rendered water-soluble by sulfonation and neutralization. Both sulfonation and carbazolization are effected in one operation by stirring the dyestuff base with the sulfonating agent until the desired extent of reaction has taken place, the point of adequacy being conveniently noted when a test portion is soluble in dilute aqueous ammonia, sodium carbonate or sodium hydroxide.

The free acid form of the dyestuff may be converted to a salt thereof by reacting it with a suitable compound containing the desired salt-forming cation. Preferably the compound is one which furnishes a water-solubilizing cation. Examples of such compounds are the hydroxides, carbonates and bicarbonates of the alkali metals and ammonium; the water-soluble alkyl and alkylolamines, etc. The sulfonic acid forms of the anthraquinone naphthocarbazole dyes of the invention are sparingly soluble in cold water, more soluble in hot water. The alkali metal salt forms are among those which are readily soluble in hot or cold water.

Among the dyestuff bases which may be sulfonated to form the dyestuffs of my invention are included:

(a) 1 - [p - (methylsulfonyl) benzamido] - 2 - methyl - 4 - (2 - naphthylamino) anthraquinone
(b) 1 - [p - (phenylsulfonyl) benzamido] - 2 - methyl - 4 - (2 - naphthylamino) anthraquinone
(c) 1 - [p - (methylsulfonyl) benzamido] - 2 - bromo - 4 - (2 - naphthylamino) anthraquinone
(d) 1 - [p - (methylsulfonyl) benzamido] - 4 - (2 - naphthylamino) anthraquinone
(e) 1 - [m - (methylsulfonyl) benzamido] - 2 - methyl - 4 - (2 - naphthylamino) anthraquinone
(f) 1 - [p - (butylsulfonyl) benzamido] - 2 - methyl - 4 - (2 - naphthylamino) anthraquinone
(g) 1 - [p - (2 - naphthylsulfonyl) benzamido] - 2 - methyl - 4 - (2 - naphthylamino) anthraquinone
(h) 1 - [p - (biphenylsulfonyl) benzamido] - 2 - methyl - 4 - (2 - naphthylamino) anthraquinone
(i) 1 - [p - (cyclohexylsulfonyl) benzamido] - 2 - methyl - 4 - (2 - naphthylamino) anthraquinone
(j) 1 - [p - (tetrahydronaphthyl) benzamido] - 2 - methyl - 4 - (2 - naphthylamino) anthraquinone
(k) 1 - [p - (ethylsulfonyl) benzamido] - 2 - methyl - 4 - (2 - naphthylamino) anthraquinone
(l) 1 - [p - (propylsulfonyl) benzamido] - 2 - methyl - 4 - (2 - naphthylamino) anthraquinone
and the like.

The new dyestuffs of my invention are useful and valuable because they impart desirable shades which are characterized by excellent light fastness and other fastness properties. From aqueous acid or neutral baths, they dye natural and synthetic nitrogenous materials, such as wool, silk, nylon and leather, deep, reddish brown shades, which are strikingly superior in depth of color to those of otherwise similar dyestuffs in which the benzoylamino group does not contain a nuclear hydrocarbonsulfonyl group. This bathochromic effect of the hydrocarbonsulfonyl groups is pronounced and is unexpected in such a slight modification in chemical structure and is particularly surprising as it occurs only when the carbazolized naphthylamino radical and the substituted benzamido radical are in para position to each other on the same benzene ring of the anthraquinone nucleus. Thus, little change results in the light reddish brown shades which are imparted by the dyestuff represented by the formula

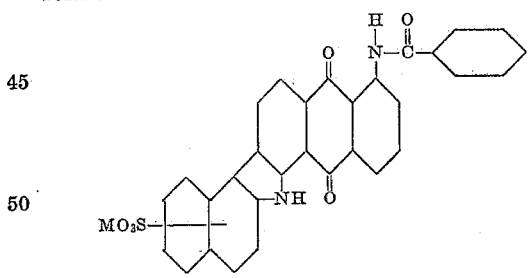

when a hydrocarbon sulfonyl group is introduced as a nuclear substituent into the benzamido radical, which, in this case is a substituent of one end-benzene ring, while the carbazolized naphthylamine radical is attached to the other end-benzene ring of the anthraquinone nucleus.

The following specific examples will further illustrate my invention. Parts are by weight except as otherwise noted.

*Example 1*

20 parts of 1-[p-(methylsulfonyl) benzamido]-2 - methyl - 4 - (2 - naphthylamino) anthraquinone (brown violet needles melting at 268°–269° C., melting point when purified= 271°–272° C.) were stirred into 100 parts of 100% sulfuric acid during about ½ hour at a temperature not exceeding 40° C. The reaction mixture was then agitated at 30°–40° C. for about 5 hours until a test sample was completely soluble in dilute aqueous sodium carbonate. The sulfonation mixture was poured slowly into about 1000 parts of ice cold 4% aqueous sodium sulfate solution, and the precipitate which formed was separated by filtration and washed with a little cold 4% aqueous sodium sulfate solution. The filter cake was slurried in water, and the mixture was neutralized with sodium carbonate and evaporated to dryness to obtain the solid dyestuff of the following formula

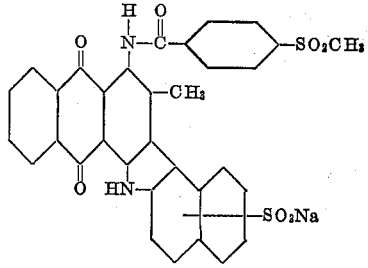

It is a dark brown water-soluble powder, which dyes wool from a neutral or acid dyebath a deep red brown shade of excellent fastness to light as well as to washing, fulling, chlorine, rubbing, perspiration, sea water, carbonizing, water-spotting, acid and alkali spotting, and stoving. Further, it is suitable for dyeing nylon (from either a neutral or acid dyebath), leather, silk, and to a lesser extent tin weighted silk and cotton.

*Example 2*

5 parts of 1-[p-(phenylsulfonyl)benzamido]- 2 - methyl - 4 - (2 - naphthylamino)anthraquinone (violet powder melting at 249° C. after recrystallization from o-dichlorobenzene) were stirred into 25 parts of 100% sulfuric acid and the reaction mixture was agitated at 40° C. for about 4 hours to complete the sulfonation. The mixture was drowned in about 250 parts of ice cold 4% aqueous sodium sulfate, and the precipitate which formed was filtered off and washed with a small amount of cold 4% aqueous sodium sulfate solution. The filter cake was slurried in water, neutralized with sodium carbonate and the resulting solution was evaporated to dryness to isolate the dyestuff having the following formula

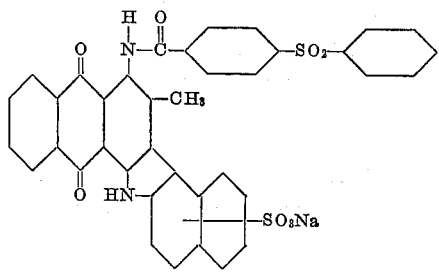

It dyes wool a deep reddish brown shade, which is slightly yellower and duller than that of the dyestuff of Example 1.

*Example 3*

20 parts of 1-[p-(methylsulfonyl)benzamido]- 2 - bromo - 4 - (2 - naphthylamino)anthraquinone (violet needles melting at 250°–252° C.) were introduced gradually with agitation into 100 parts of 100% sulfuric acid at 30°–40° C., and the reaction mixture was agitated at 40° C. for about 4 hours to complete the sulfonation. The mixture was drowned in 1000 parts of cold 4% aqueous sodium sulfate solution, and the precipitate which formed was filtered off and washed with a little cold 4% aqueous sodium sulfate. The filter cake was slurried in water and neutralized with a mixture of sodium carbonate and ammonia, and the neutralized mixture was dried at 100° C. to obtain the dyestuff. In the form of the free sulfonic acid, the dyestuff thus obtained corresponds with the following formula

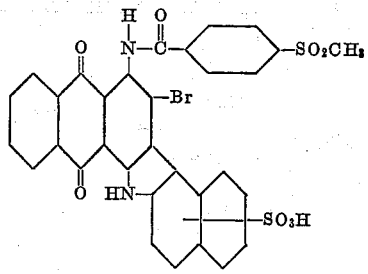

It dyes wool a deep red brown shade, which is yellower than that of the dyestuff of Example 1.

*Example 4*

A mixture of 20 parts of the dyestuff prepared in Example 3
10 parts of sodium sulfite
200 parts of water
0.2 part of sodium carbonate was heated to boiling and refluxed for 36 hours. The reaction mixture was freed from insoluble materials by filtration while hot, and the filtrate was salted with 60 parts of sodium chloride to precipitate the dyestuff, which was then filtered off and dried at 100° C. The dyestuff thus obtained possesses the following formula, in which the free acid is shown:

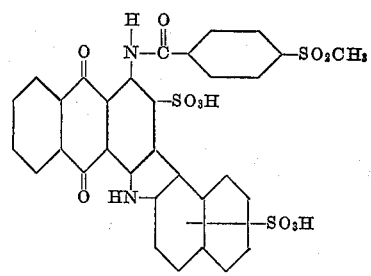

It dyes wool a deep red brown shade, which is yellower and duller than that obtained with the parent dyestuff of Example 3. It possesses better level dyeing properties than the parent dyestuff.

While the above describes the preferred embodiments of my invention, it will be understood that departures may be made therefrom within the scope of the specification and claims.

I claim:

1. As new compositions of matter, dyestuffs of the anthraquinone naphthocarbazole series which in the free acid form have the general formula

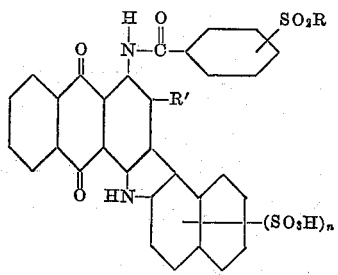

wherein R represents a hydrocarbon radical containing from 1 to 12 carbon atoms inclusive selected from the group consisting of saturated aliphatic, cycloaliphatic, aromatic and hydroaromatic radicals; R' represents a member selected from the group consisting of hydrogen, methyl, bromine and SO₃H; and n represents a positive integer.

2. The compositions of claim 1, in the form of their alkali metal salts.

3. A dyestuff which in the free acid form has the following formula

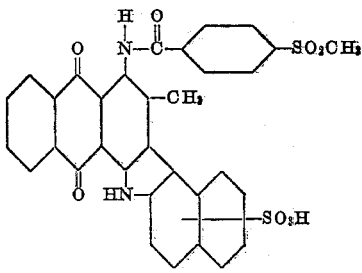

4. A dyestuff having the following formula

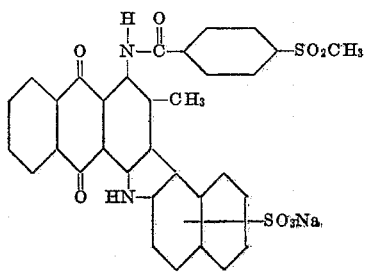

5. A dyestuff which in the free acid form has the following formula

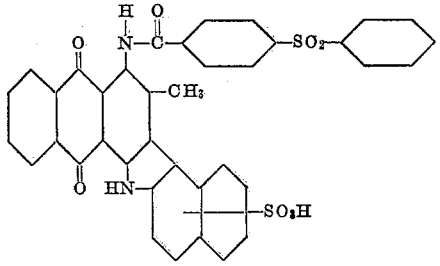

6. A dyestuff which in the free acid form has the following formula

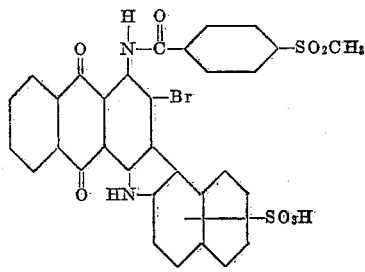

7. A dyestuff which in the free acid form has the following formula

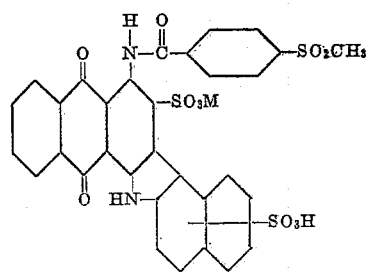

8. A process for preparing anthraquinone naphthocarbazole dyestuffs which in the free acid form have the following formula

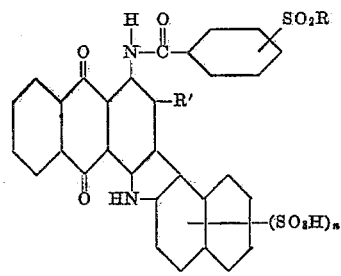

wherein R represents a hydrocarbon radical containing from 1 to 12 carbon atoms inclusive selected from the group consisting of saturated aliphatic, cycloaliphatic, aromatic and hydroaromatic radicals; R' represents a member selected from the group consisting of hydrogen, methyl, bromine and SO₃H; and n represents a positive integer, which comprises treating a dyestuff base having the formula

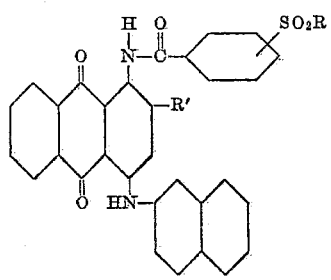

wherein R and R' are as indicated above with sulfonating agent under conditions to carbazolize the naphthylamino group and to introduce at least one sulfo group into the molecule.

9. The process according to claim 8, wherein the sulfonated carbazolized dyestuff is recovered in water-soluble form by drowning the sulfonated reaction product in water, neutralizing with a water-soluble salt-forming cation, and evaporating the solution to dryness.

10. The process according to claim 8, wherein the sulfonating agent is selected from the group consisting of hydrous and anhydrous sulfuric acids, oleum, chlorosulfonic acid and mixtures of sulfuric and chlorosulfonic acids.

11. In a process for preparing an anthraquinone dyestuff which in the free acid form has the formula

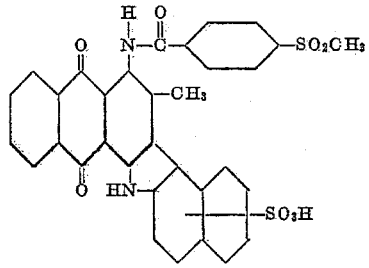

the steps which comprise reacting 1-[p-(methylsulfonyl)benzamido]-2-methyl-4-(2-naphthylamino)anthraquinone with a sulfonating agent under conditions to introduce one sulfo group into the naphthalene nucleus.

12. In a process for preparing an anthraquinone dyestuff which in the free acid form has the formula

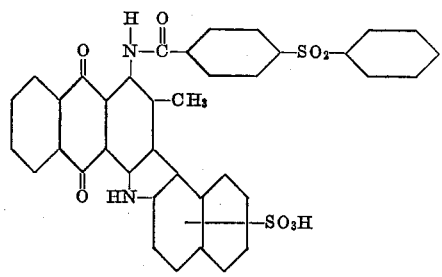

the steps which comprise reacting 1-[p-(phenyl-sulfonyl)benzamido]-2-methyl-4-(2 - naphthyl-amino)anthraquinone with a sulfonating agent under conditions to introduce one sulfo group into the naphthalene nucleus.

13. In a process for preparing an anthraquinone dyestuff which in the free acid form has the formula

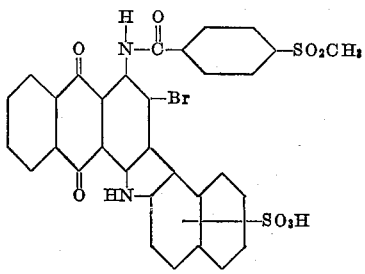

the steps which comprise reacting 1-[p-(methyl-sulfonyl)benzamido]-2-bromo-4 - (2 - naphthyl-amino)anthraquinone with a sulfonating agent under conditions to introduce one sulfo group into the naphthalene nucleus.

14. In a process for preparing an anthraquinone dyestuff which in the free acid form has the formula

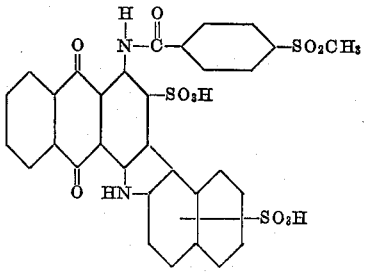

the steps which comprise reacting 1-[p-(methyl-sulfonyl)benzamido] - 2 - bromo-4-(2-naphthyl-amino)anthraquinone with a sulfonating agent under conditions to introduce one sulfo group into the naphthalene nucleus and to replace the bromo group with a sulfo group.

JAMES OGILVIE.

References Cited in the file of this patent

UNITED STATES PATENTS

| Number | Name | Date |
|---|---|---|
| 2,453,232 | Kern et al. | Nov. 9, 1948 |

FOREIGN PATENTS

| Number | Country | Date |
|---|---|---|
| 163,186 | Switzerland | Oct. 2, 1933 |
| 163,187 | Switzerland | Oct. 2, 1933 |